(12) United States Patent
Bruce et al.

(10) Patent No.: US 7,482,941 B2
(45) Date of Patent: Jan. 27, 2009

(54) PHYSICAL KEY TO FACILITATE AN INACTIVE MODE FOR A STATE-OF-CHARGE INDICATOR WITHIN A BATTERY

(75) Inventors: Gregg C. Bruce, Vancouver (CA); Christo Brand, Langley (CA)

(73) Assignee: Eaglepicher Energy Products Corporation, Surrey, BC (CA)

( * ) Notice: Subject to any disclaimer, the term of this patent is extended or adjusted under 35 U.S.C. 154(b) by 159 days.

(21) Appl. No.: 11/674,515

(22) Filed: Feb. 13, 2007

(65) Prior Publication Data

US 2007/0132431 A1    Jun. 14, 2007

Related U.S. Application Data

(63) Continuation of application No. 10/906,515, filed on Feb. 23, 2005, now Pat. No. 7,176,806.

(51) Int. Cl.
*G08B 21/00* (2006.01)
*H02J 7/00* (2006.01)
*G01N 27/42* (2006.01)
*G01N 27/416* (2006.01)

(52) U.S. Cl. ........... 340/636.1; 340/635; 340/636.12; 340/636.13; 340/636.15; 340/636.2; 320/107; 320/116; 320/124; 320/137; 320/166; 324/425; 324/426; 324/428

(58) Field of Classification Search ......... 340/635, 340/636.1, 636.11, 636.12, 636.15; 320/107, 320/116, 124, 137, 166; 324/425–428
See application file for complete search history.

(56) References Cited

U.S. PATENT DOCUMENTS

| | | | |
|---|---|---|---|
| 5,496,658 A * | 3/1996 | Hein et al. | 429/93 |
| 6,483,275 B1 * | 11/2002 | Nebrigic et al. | 320/135 |
| 6,950,030 B2 * | 9/2005 | Kovarik et al. | 340/636.1 |

* cited by examiner

*Primary Examiner*—George A Bugg
*Assistant Examiner*—Lam P Pham
(74) *Attorney, Agent, or Firm*—Snell & Wilmer L.L.P.

(57) ABSTRACT

The invention provides a system and battery including a state-of-charge indicator (SOCI) to monitor and display the amount of charge within the battery. The SOCI is capable of operating in a hibernate mode, an active mode, and/or a sleep mode. The battery may be manufactured, shipped and/or stored with the SOCI operating in a power-saving hibernate mode. The SOCI may exit the hibernate mode and begin operating in active mode if a physical key connected to the battery is removed. In addition, the SOCI may operate in a sleep mode while the battery is not being used to conserve power. Furthermore, the invention provides a method of making a battery including a SOCI to monitor and display the state of charge of the battery.

9 Claims, 5 Drawing Sheets

US 7,482,941 B2

PHYSICAL KEY TO FACILITATE AN INACTIVE MODE FOR A STATE-OF-CHARGE INDICATOR WITHIN A BATTERY

CROSS-REFERENCE TO RELATED APPLICATIONS

This application is a continuation of U.S. Ser. No. 10/906,515, filed on Feb. 23, 2005, the disclosure of which is hereby incorporated by reference.

FIELD OF THE INVENTION

The invention generally relates to batteries, and particularly, to batteries including a state-of-charge indicator capable of operating in a hibernate mode.

BACKGROUND OF THE INVENTION

When using an electronic device having a battery, it is often advantageous to know how much charge remains in the battery. In the past, batteries were manufactured without a way of knowing how much charge remained in them, which presented several problems.

Some of the problems encountered included, having to manually "test" batteries by connecting them to an electronic device to determine if they had any charge remaining (and even then how much charge they contained was usually unknowable), placing two or more batteries of different charge levels in the same device and a battery having a lower amount of charge draining charge from a battery having a higher amount of charge, and a battery running out of charge at an inconvenient time and/or location.

To overcome some of the problems associated with not knowing how much charge remained in a battery, a battery state-of-charge indicator (SOCI) was developed and connected to batteries to continuously monitor and display the amount of charge remaining. These early SOCIs, however, began to monitor and display the amount of charge remaining at the point of manufacture. Thus, a battery employing an early SOCI had a decreased overall lifetime, because the SOCI consumed power for substantially the entire time from when it was connected to the battery until the battery was completely discharged. This problem was exacerbated when such a battery was shipped and/or stored for a significant period of time, because the SOCI would continue to consume power—and sometimes completely drain the battery—prior to the battery being used.

Subsequently, a battery having a SOCI which was initially turned off was developed. These SOCIs had a removable Mylar strip located between the positive and negative terminals of the battery and were activated when the Mylar strip was removed from the battery. Once activated, the SOCI monitored and displayed the amount of charge left in the battery. Though these SOCIs overcame the problem of decreasing the overall lifetime of the battery, they presented problems of their own.

For example, in SOCIs utilizing a Mylar strip, the Mylar strip often broke without being completely removed from between the battery terminals. This resulted in the SOCI not functioning properly or not functioning at all, even after multiple attempts to remove the Mylar strip. In addition, the Mylar strip was often confusingly similar to a second Mylar strip included in some batteries for activating a complete discharge device which caused batteries to completely discharge all charge in them. Therefore, there is a need for a battery with the capability of being manufactured, shipped and/or stored with a SOCI turned off so the overall lifetime of the battery is not decreased, and include a way to activate the SOCI in a relatively easy manner that does not pose a significant risk of prematurely discharging the battery.

SUMMARY OF THE INVENTION

The present invention provides a battery including at least one battery cell connected to a state-of-charge indicator (SOCI) to display the amount of charge remaining in the battery. In accordance with an aspect of an exemplary embodiment, the battery also includes a removable physical key connected to the SOCI to control the operating mode of the SOCI.

In accordance with one exemplary embodiment, the SOCI is capable of operating in three modes: an active mode, a sleep mode, and a hibernate mode. In active mode, the SOCI may continuously monitor and display the amount of charge within the battery. When a significant amount of charge is not being drawn from the battery, the SOCI may operate in sleep mode to conserve charge by periodically checking the amount of charge in the battery and displaying the amount of charge within the battery when last checked. In addition, the battery may be manufactured, shipped, and/or stored with the SOCI in hibernate mode to minimize the amount of power consumed during periods in which it may not be necessary to monitor and display the amount of charge remaining in the battery.

In accordance with an aspect of the present invention, the battery may also include a protection circuit to protect the battery from excessive current draw, damaging temperature conditions, reverse current and/or other harmful conditions. In accordance with yet another aspect, the battery may include a complete discharge device to enable the battery to be completely discharged into a non-reactive state for non-hazardous disposal.

The invention also provides a system to indicate a battery state of charge including a battery connected to an electronic device, wherein the battery includes at least one battery cell, a SOCI having circuitry to operate in an active mode, a sleep mode and/or a hibernate mode, and a physical key connected to the SOCI to control the mode of operation of the SOCI. The system may also include a protection circuit to protect the battery from hazardous conditions, and a complete discharge device to enable the battery to discharge into a non-reactive state for non-hazardous disposal.

Another embodiment of the present invention provides a method of making a device to indicate an amount of available charge in a battery including the steps of providing a battery with at least one battery cell, connecting a SOCI to the battery cell, and configuring the SOCI to operate in a hibernate mode by connecting a physical key to a clock signal and a ground signal. In addition, the method may further include configuring the SOCI to operate in an active mode if the physical key is disconnected from the clock signal and ground signal. Furthermore, the method may include configuring the SOCI to operate in sleep mode if the SOCI does not detect a significant charge draw from the battery for a predetermined period of time. The method may also include configuring the SOCI to return to operating in active mode if the SOCI detects a significant charge draw from the battery.

BRIEF DESCRIPTION OF THE DRAWING

A more complete understanding of the present invention may be derived by referring to the detailed description and claims when considered in connection with the drawing Figures, where like reference numbers refer to similar elements throughout the Figures, and:

Figure 1:
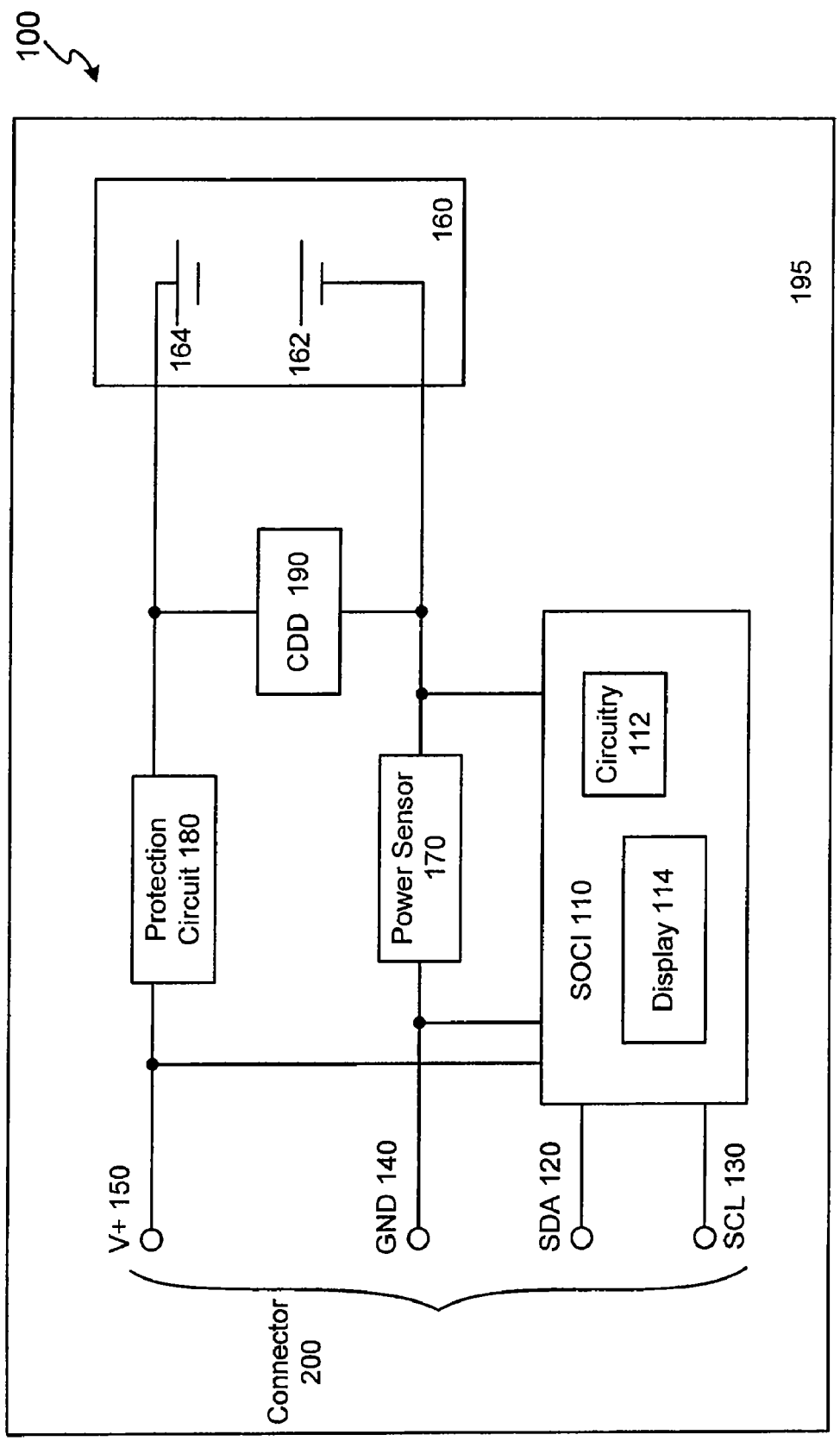
FIG. 1 is a block diagram of an exemplary embodiment of a battery including a state-of-charge indicator (SOCI)
Figure 2:
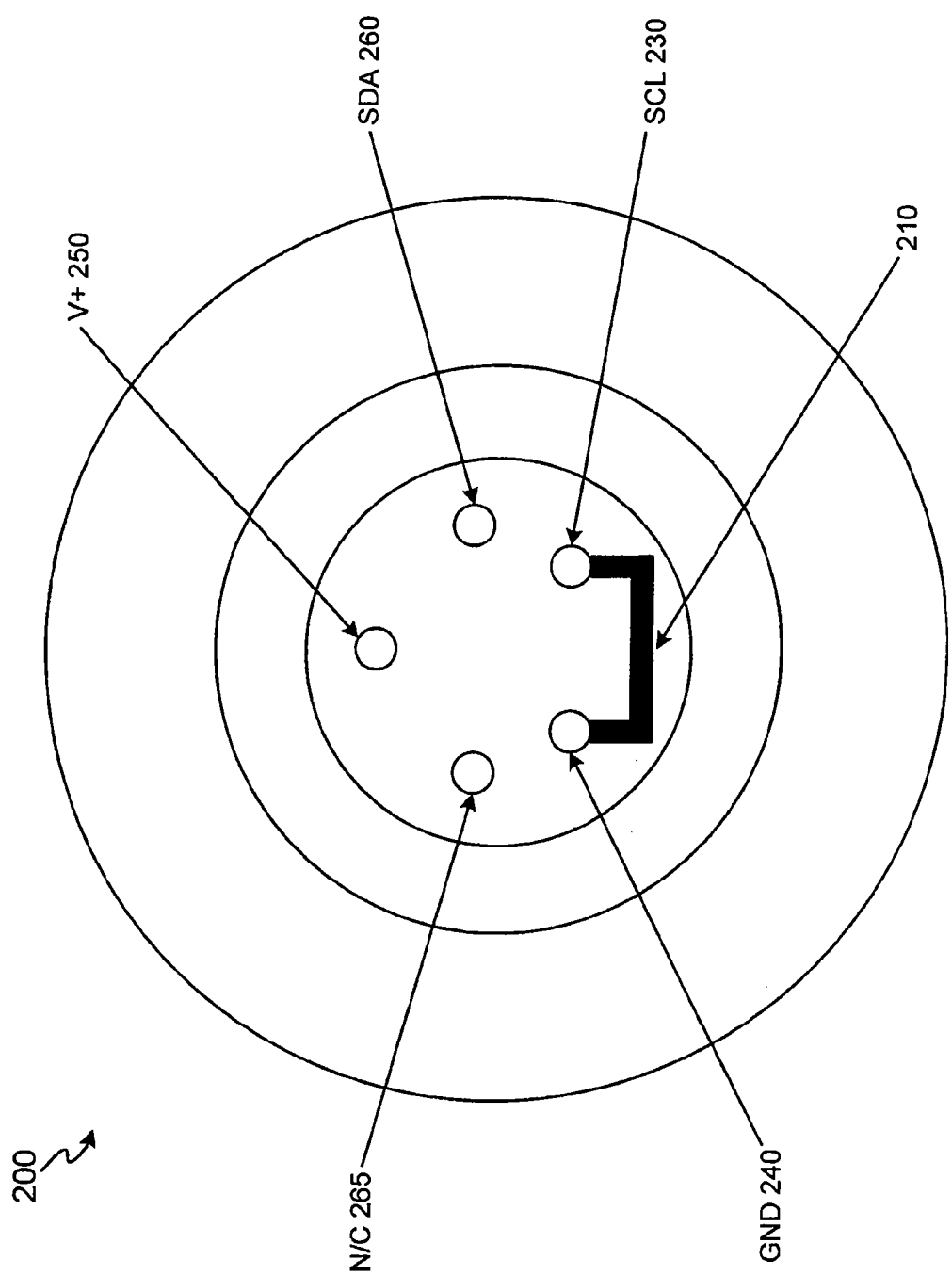
Figure 3:
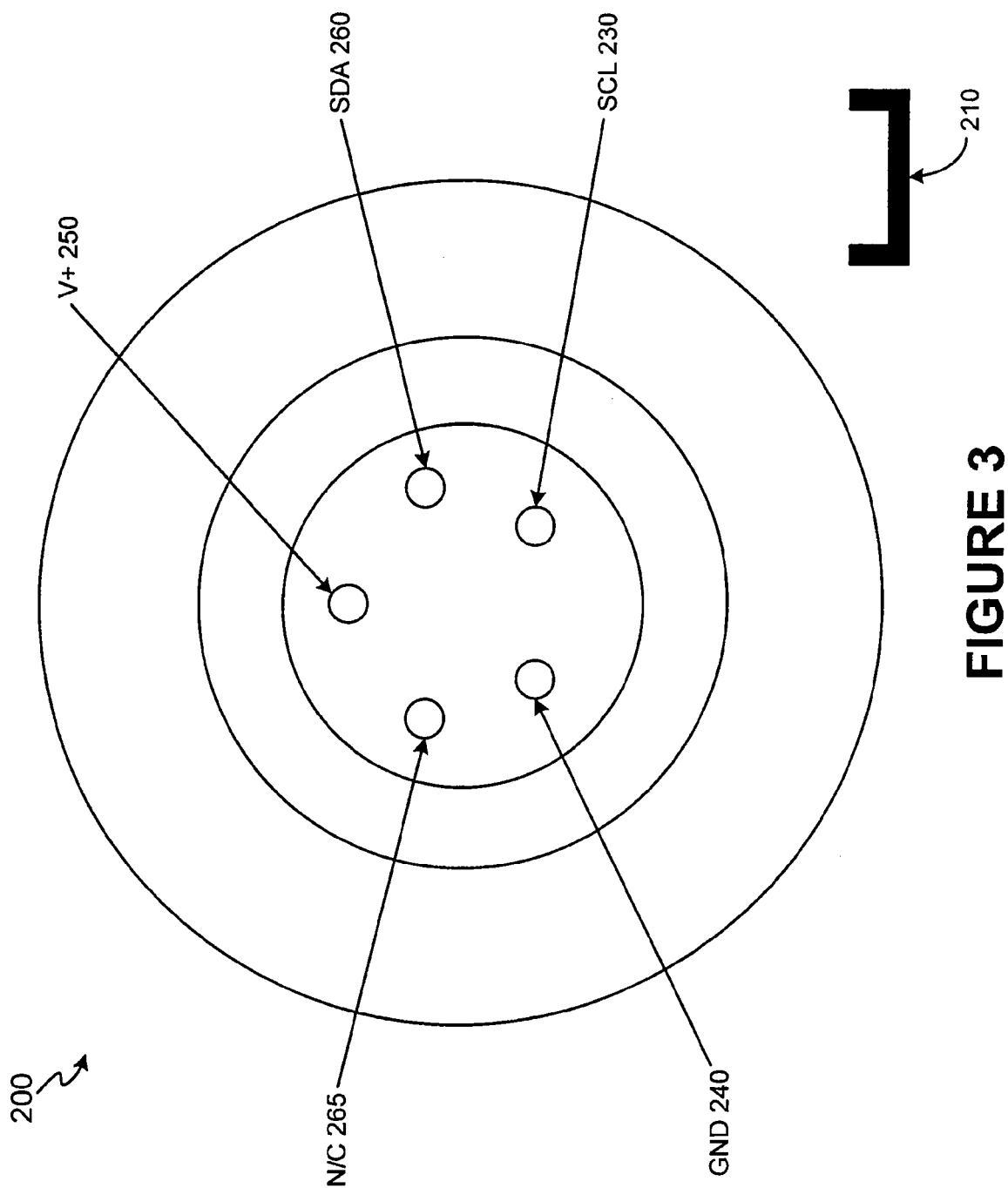
Figure 4:
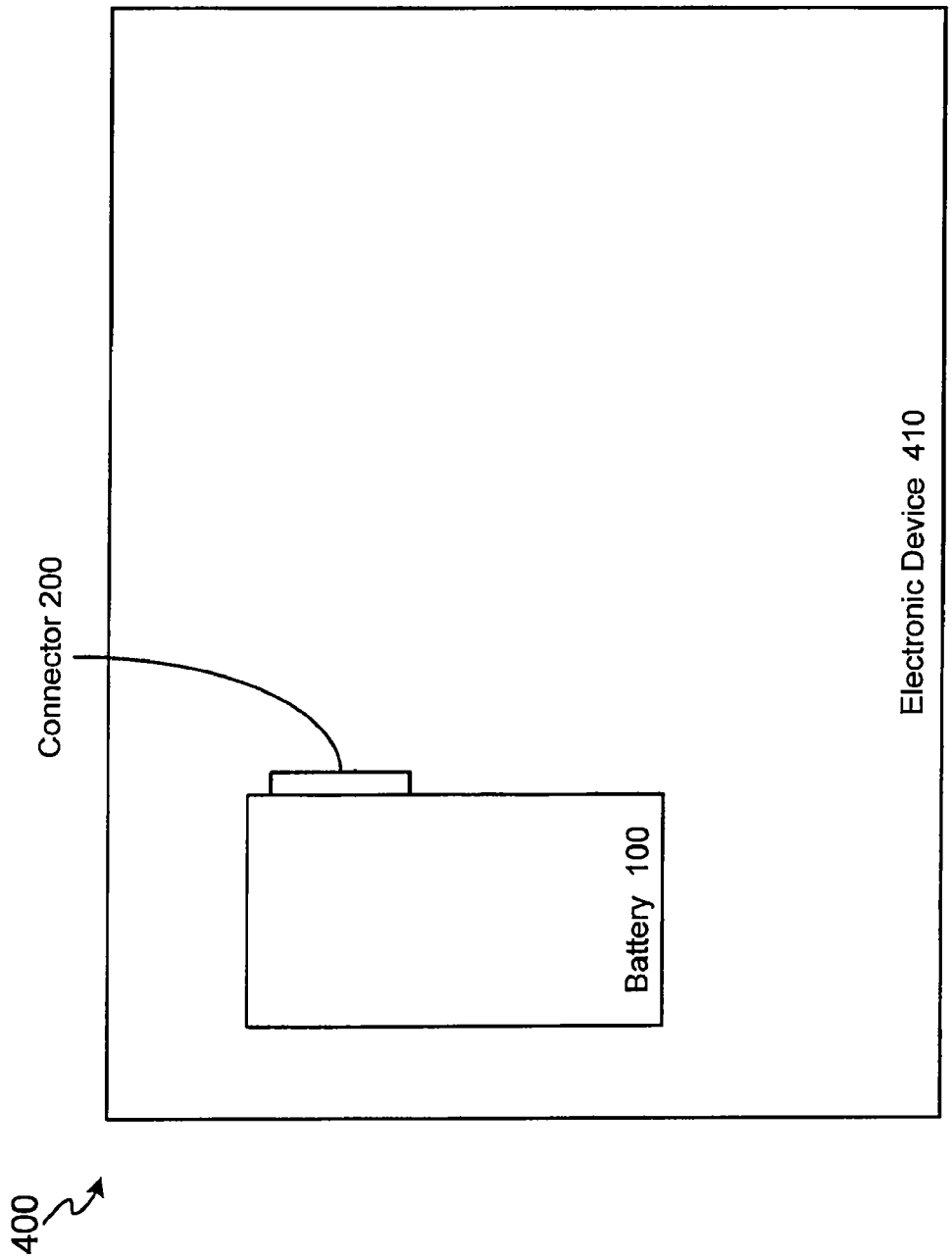
Figure 5:
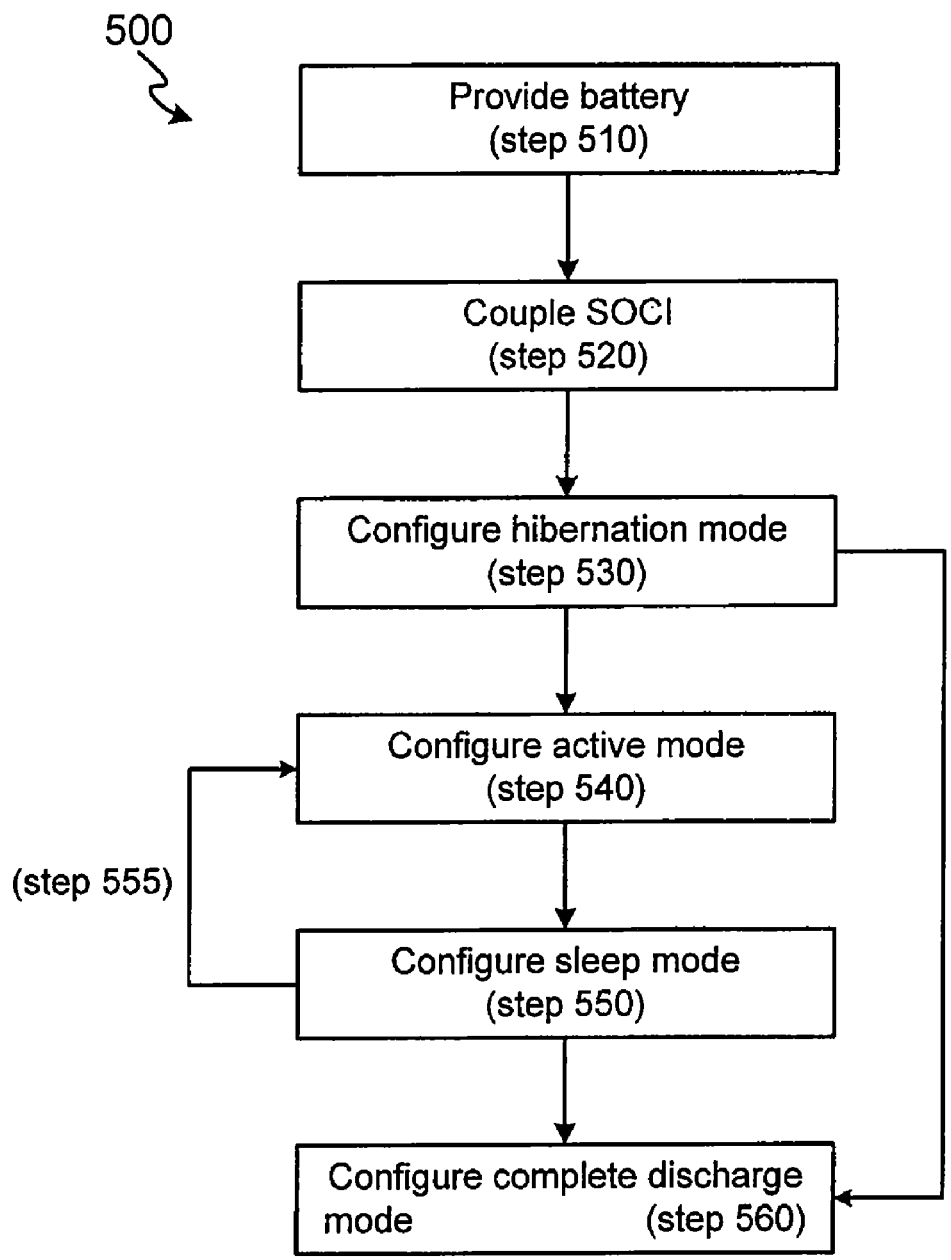

capable of operating in an active mode, sleep mode and/or hibernate mode, and a connector to facilitate which mode the SOCI operates;

FIG. 2 is a diagram of one embodiment of a connector in accordance with the exemplary embodiment illustrated in FIG. 1 including a removable physical key connected to a clock signal receptacle and a ground signal receptacle causing the SOCI to operate in one of hibernate mode and active mode;

FIG. 3 is a diagram of the exemplary embodiment of the connector in accordance with FIG. 2 with the physical key removed from the clock signal receptacle and the ground signal receptacle causing the SOCI to operate in active mode or hibernate mode;

FIG. 4 is a block diagram of one embodiment of a system including the exemplary battery in accordance with FIG. 1 connected to an electronic device; and FIG. 5 is a flow diagram of an exemplary method of making a device to indicate the amount of charge in a battery.

DETAILED DESCRIPTION

The detailed description of various exemplary embodiments of the invention herein makes reference to the accompanying drawings and figures. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, the apparatus and systems (and components of the individual operating components) may not be described in detail herein. Furthermore, the connecting lines shown in the various figures contained herein are intended to represent exemplary functional relationships and/or physical couplings between the various elements.

It should be noted that many alternative or additional functional relationships or physical connections may be present in a practical system.

Turning now to the figures, FIG. 1 is a block diagram of an exemplary embodiment of a battery 100 including a state-of-charge indicator (SOCI) 110 capable of operating in an active mode, sleep mode and/or hibernate mode, and a connector 200 (discussed in FIGS. 2 and 3 below) to facilitate which mode SOCI 110 operates in accordance with an exemplary embodiment of the invention. Battery 100 may include circuitry implementing the industry standard "Smart Bus System" (SBS), and may also include a SBS interface to allow an intelligent host, or device, to determine its current operating parameters such as, for example, current, voltage temperature, and state of charge.

SOCI 110 may comprise any hardware and/or software suitably configured to monitor and display an amount of charge in at least one battery cell stack (e.g., battery cell stack 160). In addition, SOCI 110 may comprise any SOCI currently known in the art or hereafter devised, and/or any other device capable of monitoring and displaying an amount of charge in at least one battery cell stack. In one embodiment, SOCI 110 may include circuitry 112 to operate in an active mode, a sleep mode, and/or a hibernate mode. Circuitry 112 may comprise any hardware and/or software suitably configured to continuously monitor the amount of charge in at least one battery cell stack, periodically monitor the amount of charge in at least one battery cell stack, and/or minimize the amount of charge consumed by SOCI 110. Furthermore, in accordance with various exemplary embodiments of the present invention, circuitry 112 may include any circuitry and/or device capable of continuously monitoring the amount of charge in at least one battery cell stack, periodically monitoring the amount of charge in at least one battery cell stack, and/or minimizing the amount of charge consumed by SOCI 110.

In accordance with an exemplary aspect of another embodiment of the invention, SOCI 110 may include a display 114 to indicate the amount of charge remaining in at least one battery cell stack, and may comprise any hardware and/or software suitably configured to display the same. In an exemplary embodiment, display 114 is a liquid crystal display (LCD). In other exemplary embodiments, display 114 may be a light emitting diode (LED), an energy conversion device (ECD), a plasma display panel (PDP), a gas-plasma display, an electroluminescent display (ELD), a vacuum fluorescent display (VFD), a cathode-ray tube (CRT), or any other device capable of displaying the amount of charge contained within at least one battery cell stack. In accordance with one aspect of the present invention, display 114 is configured to display the amount of charge utilizing alphanumeric symbols, color symbols, level bars, graphic representations, and/or any other indicia of an amount/level of charge in a battery. In accordance with one aspect of the present invention, display 114 indicates the amount of charge remaining in at least one battery cell stack 160 as a percentage. In another aspect, display 114 indicates the amount of charge using level bars.

For example, display 114 may include five level bars, each indicating roughly 20 percent, and may initially have all five bars illuminated when battery cell stack 160 is fully charged, and subsequently decrease the number of level bars illuminated by one for each 20 percent of charge consumed from battery cell stack 160. In another similar example, the five level bars are not initially illuminated, but each level bar becomes appropriately illuminated as 20 percentile of charge is consumed from battery cell stack 160.

Battery 100, in accordance with another exemplary embodiment, includes a signal data line (SDA) 120 and a clock signal line (SCL) 130 connected to SOCI 110 and connector 200. SDA 120, in one aspect of the present invention, may be any wire and/or bus capable of transmitting data and/or signals within battery 100. Similarly, SCL 130 may be any wire and/or bus capable of transmitting a clock signal within battery 100. In an exemplary embodiment, battery 100 includes a ground line (GND) 140 and a positive line (V+) 150 connected to SOCI 110 and battery cell stack 160. GND 140 and V+ 150, in one exemplary aspect, may be any wire and/or bus capable of conducting current within battery 100.

In one exemplary embodiment, battery cell stack 160 includes a single battery cell 162. Battery cell 162, in one aspect of the present invention, is a battery cell comprising a lithium-ion cell, a zinc-carbon cell, an alkaline cell, a lithium-iodide cell, a lead-iodide cell, a lead-acid cell, a nickel-cadmium cell, a nickel-metal hydride cell, a zinc-air cell, a silver-zinc cell, a metal chloride cell, or any other composition capable of storing charge. In another aspect of the present invention, battery cell stack 160 may include one or more additional battery cells (e.g., battery cell 164) similar to battery cell 162 to increase the voltage of battery cell stack 160. For example, if a nine-volt battery is required to power a certain electronic device, battery cell stack 160 may include six 1.5 Volt battery cells of an appropriate chemistry similar to battery cell 162 and/or battery cell 164. In accordance with this exemplary embodiment, as shown in FIG. 1, battery cell stack 160 may be a three-volt cell stack. In accordance with one exemplary embodiment of the invention, battery cell stack 160 may include from one to 11 battery cells providing a voltage range of about 1.5 volts to about 16.5 volts. However, various embodiments of the invention contemplate that battery cell stack 160 may include any number of battery cells, and provide a considerable range of voltage possibilities depending on the chosen cell chemistry and battery cell stack configuration.

Battery 100, in accordance with another exemplary embodiment, includes charge sensor 170 connected to SOCI 110 and battery cell stack 160 by GND 140. Charge sensor 170 may comprise any hardware and/or software suitably configured to detect and transmit the amount of charge being drawn from battery cell stack 160. As such, aspects of the present invention contemplate that charge sensor 170 may be any charge sensor or any other device capable of detecting and transmitting the amount of charge being drawn from a battery cell stack. In accordance with one exemplary embodiment, charge sensor 170 is configured to detect the amount of charge being drawn from battery cell stack 160 and transmit a signal to SOCI 110 indicating whether the amount of charge is significant and/or insignificant based on a predetermined threshold amount.

In accordance with another exemplary embodiment of the present invention, battery 100 includes protection circuit 180 connected to battery cell stack 160 on V+ 150. Protection circuit 180, in accordance with one exemplary aspect of the invention, may comprise any hardware and/or software suitably configured to protect battery cell stack 160 from hazardous harmful conditions. As such, in accordance with this aspect of an exemplary embodiment, protection circuit 180 may be any protection circuit or any other device known in the art capable of protecting battery cell stack 160 from hazardous, harmful, or otherwise undesirable conditions. In accordance with one exemplary embodiment, protection circuit 180 is circuitry configured to protect battery cell stack 160 from excessive current draw (e.g., a maximum of current draw of between about 10 mA to about 100 mA), damaging temperature conditions (e.g., temperatures less than −32° C. and/or temperatures greater than +58° C. during operation, and/or temperatures less than −40° C. and/or greater than +74° C. during storage), voltage drop (e.g., a maximum voltage drop of about 0.65 V to about 0.95 V), and/or reverse current (e.g., about 2.0 mA). As such, protection circuit 180 may be any circuitry and/or device capable of protecting battery cell stack 160 from at least these hazardous, harmful, or otherwise undesirable conditions.

Battery 100, in accordance with another exemplary embodiment of the present invention, includes a complete discharge device (CDD) 190. In one exemplary aspect of the invention, CDD 190 may comprise any hardware and/or software suitably configured to completely discharge battery 100 into a non-reactive state when actuated. As such, in accordance with this aspect of an exemplary embodiment, CDD 190 may be any CDD or any other device known in the art, or hereafter devised, capable of completely discharging battery cell stack 160. In an exemplary embodiment, CDD 190 includes a resistive load to discharge battery 100, and an actuator (e.g., a Mylar strip) to initiate complete discharge of battery 100. In one exemplary aspect of the present invention, CDD 190 may be connected to GND 140 and V+ 150, and may be oriented within battery 100 to bypass protection circuit 180. In the embodiment illustrated in FIG. 1, CDD 190 is oriented between protection circuit 180 and battery cell stack 160. However, various embodiments of the invention contemplate that CDD 190 may be oriented in any manner that allows CDD 190 to substantially discharge battery cell stack 160 despite the protective nature of protection circuit 180. In another exemplary aspect of the present invention, CDD 190 may include an indicator (not shown) to show that discharge is in progress and/or complete. In one embodiment, the indicator is a LED indicator, which may be any color (e.g., green). However, various embodiments of the invention contemplate that the indicator may be any indicator or device known in the art, or hereafter devised, for indicating that discharge is in progress and/or complete. The CDD indicator is, preferably, different in appearance from display 114 in order not to be confused with display 114.

In accordance with one exemplary embodiment, each of the components (e.g., SOCI 110, SDA 120, SCL 130, GND 140, V+ 150 cell stack 160, charge sensor 170, protection circuit 180, CDD 190 and/or connector 200) forming battery 100 are interconnected by, and/or included on a printed circuit board (PCB) 195. PCB 195, in accordance with an exemplary aspect of the invention, may comprise any PCB or other device known in the art, or hereafter devised, capable of connecting and/or including components forming battery 100.

As noted above, the present invention contemplates including multiple battery cell stacks 160. In one exemplary embodiment, each battery cell stack or a subset of battery cell stacks may be monitored and the amount of charge displayed on SOCI 110, whether individually, as a subset, and/or as a whole. In another exemplary embodiment, only one of the multiple battery cell stacks 160 may be monitored and displayed on SOCI 110 since each battery cell stack 160, presumably, may contain a similar amount of charge.

FIG. 2 is a diagram of one exemplary embodiment of connector 200 of FIG. 1 including a removable physical key 210 connected to a clock signal (SCL) 230 and a ground signal (GND) 240, causing SOCI 110 to operate in hibernate mode or active mode. In accordance with various embodiments of the present invention, connector 200 may comprise any material and shape suitable for connecting physical key 210 and/or any other device to battery 100. As such, the various embodiments of the invention contemplate that connector 200 may be any connector or connection device known in the art, or hereafter devised. In an exemplary embodiment, connector 200 is a circular piece of metal, alloy, plastic, ceramic and/or any other appropriate material, and comprises at least one receptacle capable of holding physical key 210.

In accordance with various embodiments of the present invention, physical key 210 may be any physical key or device suitably configured to attach to connector 200, and cause an open, or short, circuit in battery 100. In one exemplary embodiment, physical key 210 is formed of metal. In other exemplary embodiments, physical key 210 is formed of an alloy, a plastic, a ceramic, and/or any other material capable of causing an open circuit in battery 100 when physical key 210 is properly attached to connector 200, or causing a closed circuit when physical key 210 is removed from connector 200. Likewise, various embodiments of the present invention contemplate that physical key 210 may form any suitable shape capable of causing an open circuit in battery 100 when physical key 210 is properly attached to connector 200, or causing a closed circuit when physical key 210 is removed from connector 200.

In an exemplary embodiment of the present invention, physical key 210 is attached to connector 200 via SCL receptacle 230 and GND receptacle 240. SCL receptacle 230, in accordance with one aspect of the present invention, may form any suitable shape, of any suitable material which allows physical key 210 to become physically attached to SCL receptacle 230 and electrically attached to SCL 130 (discussed above). Likewise, GND receptacle 240 may form any suitable shape of any suitable material to allow physical key 210 to become physically attached to GND receptacle 240 and electrically attached to GND 140 (discussed above). In accordance with various aspects of the present invention, SCL receptacle 230 and GND receptacle 240 may be configured to form an open circuit between SCL 130, GND 140, and SOCI 110 when physical key 210 is attached to both SCL receptacle 230 and GND receptacle 240 following a shutdown sequence. In accordance with various other aspects of the invention, SCL receptacle 230 and GND receptacle 240 may be configured to form a closed circuit between SCL 130, GND 140, and SOCI 110 when physical key 210 is attached to both SCL receptacle 230 and GND receptacle 240. In one exemplary aspect of the invention, during the manufacturing process, a worker may have a limited amount of time (e.g., 60 seconds) following the shutdown sequence to attach physical key 210 to SCL receptacle 230 and GND receptacle 240 to place SOCI in hibernate mode.

In another exemplary embodiment, connector 200 also includes V+ receptacle 250 and SDA receptacle 260 to allow a device, wire, and/or bus to become physically and/or electrically connected to V+ 150 (discussed above) and SDA 160 (discussed above), respectively. In yet another exemplary embodiment, connector 200 includes a separate receptacle (N/C) 265 which may remain unconnected to an electronic device, or may be used for other suitable purposes.

FIG. 3 is a diagram of connector 200 with physical key 210 removed from SCL receptacle 230 and GND receptacle 240, causing SOCI 110 to operate in active mode or hibernate mode. In accordance with one exemplary embodiment of the present invention, physical key 210 is configured to be removed from SCL receptacle 230 and GND receptacle 240 by hand (e.g., by pulling physical key 210 out of SCL receptacle 230 and GND receptacle 240). In another exemplary embodiment, physical key 210 is removed by mechanical means. In accordance with one aspect of the present invention, SCL receptacle 230 and GND receptacle 240 may be configured to form a closed circuit between SCL 130, GND 140, and SOCI 110 when physical key 210 is removed from SCL receptacle 230 and GND receptacle 240. In accordance with another aspect of the present invention, SCL receptacle 230 and GND receptacle 240 may be configured to form an open circuit between SCL 130, GND 140, and SOCI 110 when physical key 210 is removed from SCL receptacle 230 and GND receptacle 240.

FIG. 4 is a block diagram of an exemplary embodiment of a system 400 including battery 100 of FIG. 1 connected to an electronic device 410. Electronic device 410, in accordance with an exemplary embodiment of the present invention, is connected to battery 100 via connector 200, and may be any device suitably configured to utilize battery 100 for a least a portion of the charge needed to power electronic device 410. Exemplary embodiments of electronic device 410 include, but are not limited to, a computing device (e.g., a laptop computer or a PDA), a communication device (e.g., a radio, a cellular telephone, or a pager), a global positioning device (e.g. a GPS device), a stereo, a video game player, a CD player, a DVD player, and/or any other electronic device where it may be desirable to know the amount of charge contained within at least one of its batteries and/or battery cell stacks.

FIG. 5 is a flow diagram of an exemplary method 500 of making a battery including a SOCI 110 to indicate the amount of charge within in at least one battery cell stack. In accordance with one exemplary embodiment of the present invention, method 500 initiates by providing a battery 100 including at least one battery cell stack 160 (step 510), and connecting SOCI 110 to battery cell stack 160 (step 520).

Method 500, in accordance with another exemplary embodiment, also includes configuring SOCI 110 to operate in a hibernate mode (step 530). In accordance with one aspect of an exemplary embodiment, configuring SOCI 110 to operate in a hibernate mode may include configuring SOCI 110 to form an open circuit with battery cell stack 160 when physical key 210 is connected to GND receptacle 230 and SCL receptacle 240, and performing a shutdown sequence. In accordance with one aspect of another exemplary embodiment, configuring SOCI 110 to operate in a hibernate mode may include configuring SOCI 110 to form an open circuit with battery cell stack 160 when physical key 210 is removed from GND receptacle 230 and SCL receptacle 240. In accordance another aspects of the present invention, forming an open circuit in battery 100 may allow SOCI 110 to draw the minimum possible amount of charge from battery cell stack 160, and facilitate maximum lifetime of battery 100. In accordance with an exemplary aspect of the exemplary embodiment, the amount of charge SOCI 110 may draw when operating in hibernate mode may be a maximum of about 10 µA, or about 0.09 Ah per year.

In accordance with one exemplary embodiment of the present invention, method 500 includes configuring SOCI 110 to operate in an active mode (step 540). An aspect of the exemplary embodiment of configuring. SOCI 110 to operate in active mode may include configuring SOCI 110 to form a closed circuit with battery cell stack 160 if physical key 210 is removed from SCL receptacle 230 and GND receptacle 240. In accordance with another aspect of the invention, configuring SOCI 110 to operate in active mode may include configuring SOCI 110 to form a closed circuit with battery cell stack 160 if physical key 210 is attached to SCL receptacle 230 and GND receptacle 240. In accordance with various exemplary embodiments, removal or attachment of physical key 210 may allow SOCI 110 to draw enough charge from battery cell stack 160 to operate in active mode, which may include continuously monitoring battery cell stack 160, performing calculations based on the monitored information to determine the amount of charge left in battery cell stack 160, and displaying the result on display 114. In accordance with another aspect of the exemplary embodiment, configuring SOCI 110 to operate in active mode may include configuring SOCI 110 to continuously monitor the voltage, temperature, and/or current draw from battery cell stack 160 to determine the amount of charge remaining in battery cell stack 160. In yet another aspect of the exemplary embodiment, SOCI 110 may consume 1.5 mA, or about 1.0 Ah per month, when operating in active mode.

In another exemplary embodiment, method 500 includes configuring SOCI 110 to operate in a sleep mode if SOCI 110 detects an insignificant amount of charge being drawn from battery cell stack 160 while SOCI 110 is operating in active mode (step 550). In one aspect of the exemplary embodiment, configuring SOCI 110 to operate in sleep mode may include configuring SOCI 110 to cease continuously monitoring battery cell stack 160, and begin periodically monitoring battery cell stack 160. Periodically monitoring battery cell stack 160, in accordance with one aspect of the exemplary embodiment, may include monitoring battery cell stack 160 about every 10 minutes, every hour, or any other appropriate period of time to reduce charge consumption. Hence, in one embodiment, the voltage, temperature and/or amount of current drawn from battery cell stack 160 may be periodically monitored and displayed. In another aspect of the exemplary embodiment, configuring SOCI 110 to operate in sleep may include configuring SOCI to periodically monitor battery cell stack 160, but continuously display an amount of charge in battery cell stack 160. In this exemplary aspect, the amount of charge displayed on display 144 may reflect the amount of charge within battery cell stack 160 when SOCI 110 last checked cell stack 160. In yet another aspect of the exemplary embodiment, once in sleep mode, SOCI 110 may sleep until a button, switch and/or other device is actuated.

An insignificant amount of charge may be any amount of charge less than a predetermined threshold amount being drawn from battery cell stack 160. As such, the predetermined threshold amount may vary depending on the type of battery 100 and/or application of battery 100. In accordance with another aspect of the exemplary embodiment, SOCI 110, when operating in sleep mode, may consume a maximum of 200 μA, or about 0.15 Ah per month. Thus, by operating in sleep mode, SOCI 110 may consume less charge than when operating in active mode.

In yet another exemplary embodiment of the present invention, method 500 includes configuring SOCI 110 to again operate in active mode if, when operating in sleep mode, SOCI 110 detects a significant amount of charge being drawn from battery cell stack 160 (step 555). A significant amount of charge may be any amount greater than a predetermined threshold amount. Similar to the sleep mode-triggering threshold amount, the active mode-triggering threshold amount may vary depending on the type of battery 100 and/or application of battery 100. In aspect of the exemplary embodiment, the active mode-triggering threshold amount is similar to, or the same as the sleep mode-triggering threshold amount. In other aspects of the exemplary embodiment, the active mode-triggering threshold amount is different from the sleep mode-triggering threshold amount.

Method 500, in another exemplary embodiment, includes configuring battery 100 to comprise CDD 190 to substantially discharge cell stack 160 for non-hazardous disposal if an actuator associated with CDD 190 is triggered (step 560). Substantially discharging cell stack 160, in one aspect of the exemplary embodiment, allows battery 100 to enter a non-reactive state that may pose little adverse affect on the environment if battery 100 is discarded. In addition, various embodiments of the invention contemplate that battery 100 may be formed of at least of portion of recyclable material, and when completely and/or sufficiently discharged, allow at least a portion of battery 100 to be recycled.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

We claim:

1. A method of making a device to indicate an amount of available charge in at least one battery cell comprising the steps of:

providing a battery with at least one battery cell, a ground signal, and a clock signal, coupling a state-of-charge indicator to said at least one battery cell within said battery, and configuring said state-of-charge indicator to operate in a hibernation mode by coupling a detachable physical key to said ground signal and said clock signal.

2. The method of claim 1, wherein configuring said state-of-charge indicator to operate in a hibernation mode comprises the step of:

configuring said state-of-charge indicator to draw a minimum amount of charge from said at least one battery cell by coupling a detachable physical key to said ground signal and said clock signal.

3. The method of claim 1, further comprising the step of:

configuring said state-of-charge indicator to operate in an active mode if said detachable physical key is removed from said ground signal and said clock signal.

4. The method of claim 3, wherein said step of configuring said state-of-charge indicator to operate in an active mode comprises the step of:

configuring said state-of-charge indicator to continuously monitor at least one of current, voltage and temperature of said at least one battery if said detachable physical key is removed from said ground signal and said clock signal.

5. The method of claim 3, further comprising the step of:

configuring said state-of-charge indicator to operate in a sleep mode if said state-of-charge indicator does not detect a significant charge draw from said at least one battery for a predetermined period of time while said state-of-charge indicator is operating in said active mode.

6. The method of claim 5, wherein said step of configuring said state-of-charge indicator to operate in a sleep mode comprises the step of:

configuring said state-of-charge indicator to cease continuously monitoring said at least one battery if said state-of-charge indicator does not detect a significant charge draw from said at least one battery for a predetermined period of time while said state-of-charge indicator is operating in said active mode.

7. The method of claim 5, wherein said step of configuring said state-of-charge indicator to operate in a sleep mode comprises the step of:

configuring said state-of-charge indicator to periodically monitor at least one of current, voltage and temperature of said at least one battery if said state-of-charge indicator does not detect a significant charge draw from said at least one battery for a predetermined period of time while said state-of-charge indicator is operating in said active mode.

8. The method of claim 6, further comprising the step of:

configuring said state-of-charge indicator to operate in said active mode if said state-of-charge indicator detects a significant charge draw in said at least one battery while operating in said sleep mode.

9. The method of claim 8, further comprising the steps of:

coupling a complete discharge device to said at least one battery cell; and completely discharging said at least one battery cell, wherein said at least one battery cell is completely discharged when a minimum threshold voltage is reached.

* * * * *